Figures 1, 2, 3:
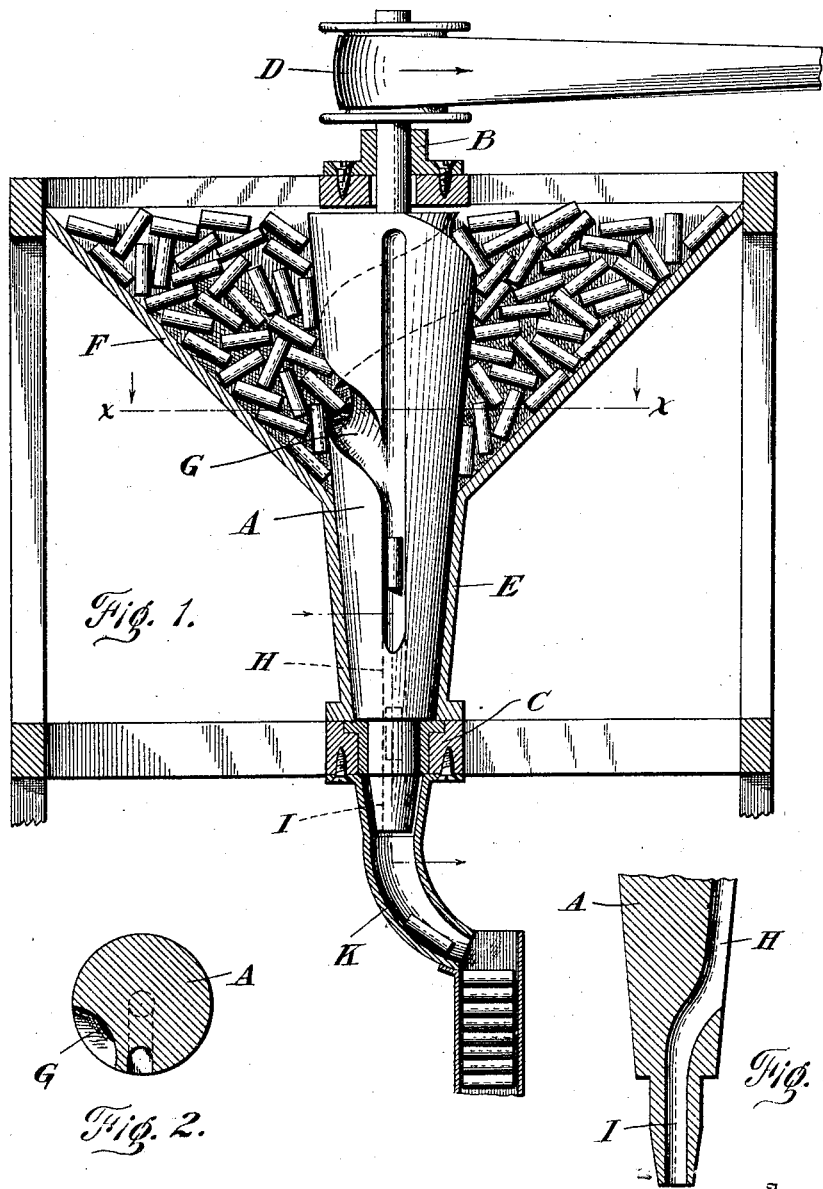

H. A. RUSSELL.
DOWEL FEEDING DEVICE.
APPLICATION FILED FEB. 1, 1911.

1,031,589.

Patented July 2, 1912.

Witnesses
Chas. W. Stauffiger
Anna E. Ravder

Inventor
HERBERT A. RUSSELL.
By
Attorneys.

UNITED STATES PATENT OFFICE.

HERBERT A. RUSSELL, OF GRAND LEDGE, MICHIGAN.

DOWEL-FEEDING DEVICE.

1,031,589.    Specification of Letters Patent.    Patented July 2, 1912.

Application filed February 1, 1911. Serial No. 605,865.

*To all whom it may concern:*

Be it known that I, HERBERT A. RUSSELL, a citizen of the United States of America, residing at Grand Ledge, in the county of Eaton and State of Michigan, have invented certain new and useful Improvements in Dowel-Feeding Devices, of which the following is a specification, reference being had therein to the accompanying drawings.

This invention relates to a device for feeding dowels to doweling machines. To this end the device comprises a stationary hopper from which the dowels are fed by gravity one by one into a tubular spout which leads to the dowel receptacle of a doweling machine, all as more fully hereinafter described and shown in the accompanying drawings, in which—

Figure 1 is a vertical central section of the device; Fig. 2 is a vertical central section of the lower portion of the spindle and Fig. 3 is a cross section of the spindle on line $x$—$x$ Fig. 1.

In the drawings A is a tapering spindle vertically journaled in stationary bearings B and C at its upper and lower ends respectively and provided with means such as the pulley D for rotating it upon its axis in the direction shown by the arrow in Fig. 1. The spindle rotates within an outer shell E which loosely fits around the lower portion of the spindle and enlarges around the upper portion into a funnel shaped hopper F. The portion of the spindle which is surrounded by the hopper is provided with a spiral groove G and the lower inclosed portion is provided with a vertical channel H forming a downward continuation of the spiral groove. This channel below its junction with the spiral groove gradually curves inward toward the axis of the spindle and then straightens out into a central bore I terminating at the lower end of the spindle which forms a nipple and projects into a tubular conduit K leading to the dowel receptacle of the doweling machine.

In practice the hopper being filled with the dowels and the spindle revolving in the direction indicated, it will be readily understood that on account of the size of the spiral groove, some dowels immediately surrounding the spindle will be caught by the edges of the spiral and drawn into the groove and alined therewith, and owing to the depth of the groove will become separated from the bulk in the hopper and carried by gravity into the channel H which allows only one to enter at a time. In addition to up-ending the dowels, the spiral groove also prevents the dowels from obstructing the outlet from the hopper since the direction in which the spindle is revolved causes the spiral to seize the dowels which obstruct and carry them up or away from the outlet thus freeing the outlet to permit the dowels which are in position to be fed to drop into the channel. From the channel the dowels are then conducted by gravity through the bore I and spout K into the dowel receptacle at the end of the spout, the dowels being discharged from the spout in the direction wiven thereto by the spout.

In the drawing I have shown the channel I continued upwardly beyond its junction with the spiral groove; this upward continuation is not essential but it will supplement the action of the spiral groove.

It will be noted that the spindle revolves in such a direction that the spiral groove has a tendency to lift the dowels instead of forcing them down. This is essential as it prevents the dowels from choking in the groove and rendering the device inoperative.

The advantage of tapering the spindle is that the groove and the channel H are thereby made to incline toward the axis of the spindle and thus lead the dowels gradually toward the central bore without making any abrupt changes in the direction of feeding them, but it will be understood that such shape is not absolutely necessary.

What I claim is:

1. In a dowel feeding device, the combination of a vertical spindle rotating in fixed bearings and a stationary casing forming an inclosing wall around the peripheral surface of the lower portion of the spindle and extending upwardly and outwardly therefrom to form a hopper adapted to receive and hold a supply of dowel pins against the peripheral surface of the upper portion of the spindle, said surface being provided with a vertical channel extending downwardly through the walled in portion and terminating in a central outlet in the lower end of the spindle and also provided upon its peripheral surface within the hopper with a spiral groove communicating with the vertical channel.

2. In a dowel feeding device, the combination of a vertical spindle rotating in fixed bearings and a stationary casing forming an inclosing wall around the peripheral surface of the lower portion of the spindle and extending upwardly and outwardly therefrom to form a conical hopper around the peripheral surface of the upper portion of the spindle adapted to receive and hold a supply of the dowel pins against said peripheral surface the spindle being provided upon its peripheral surface with a vertical channel leading from the upper portion to a central outlet in the lower end thereof with a spiral groove upon the upper portion within the hopper.

3. In a dowel feeding device, the combination with a supporting frame, of a spindle journaled in vertical bearings in said frame and provided with means for rotating it, and an outer stationary casing forming an inclosing wall around the lower portion of the peripheral surface of the spindle and extending upwardly and outwardly therefrom around the upper portion thereof, the casing forming a space between it and said peripheral surface constituting a hopper adapted to hold a supply of dowel pins against said peripheral surface, the spindle being provided upon its peripheral surface with a vertical channel leading from a point within the hopper to a central outlet in the lower end of the spindle and forming a passage through which the dowels are adapted to discharge by gravity directly from the bulk in the hopper.

4. In a dowel feeding device, the combination with a supporting frame, of a taper spindle journaled therein in vertical bearings at its upper and lower ends and provided at its upper end with means for rotating it, a casing around the upper portion of the spindle and spaced therefrom to form a conical hopper between it and the peripheral surface thereof, adapted to receive and hold a supply of dowel pins against said peripheral surface, and an inclosing wall around the peripheral surface of the spindle below the hopper, there being a vertical channel in the peripheral surface of the spindle leading from the upper portion of the spindle through the walled in portion to a central outlet in the lower end of the spindle and forming a gravity passage for the direct discharge of the dowels from the bulk in the hopper.

In testimony whereof I affix my signature in presence of two witnesses.

HERBERT A. RUSSELL.

Witnesses:
 BYRON D. NILES,
 CHAS. S. SHANE.